(12) United States Patent
Kato et al.

(10) Patent No.: US 6,774,173 B2
(45) Date of Patent: Aug. 10, 2004

(54) CLEAR PAINT COMPOSITIONS FOR MOTORCARS

(75) Inventors: Kazuhiro Kato, Nishi-Kamo-gun (JP); Kazuaki Kitazono, Nisshin (JP); Yoshizumi Matsuno, Hadano (JP); Hiroshi Igarashi, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 10/188,887

(22) Filed: Jul. 5, 2002

(65) Prior Publication Data

US 2003/0125460 A1 Jul. 3, 2003

(30) Foreign Application Priority Data

Jul. 5, 2001 (JP) .......................................... 2001-205091

(51) Int. Cl.⁷ .............................................. C08G 18/10
(52) U.S. Cl. .................... 524/513; 525/131; 428/423.1; 428/442.8; 428/424.2; 427/407.1; 427/409; 528/59; 528/67; 528/66
(58) Field of Search ....................... 525/131; 428/423.1, 428/422.8, 424.2; 427/407.1, 409; 528/59, 67, 66; 524/513

(56) References Cited

U.S. PATENT DOCUMENTS

| | | | | |
|---|---|---|---|---|
| 4,382,114 A | * | 5/1983 | Hohlein et al. | 428/423.1 |
| 5,468,802 A | * | 11/1995 | Wilt et al. | 524/539 |
| 5,609,918 A | | 3/1997 | Yamaguchi et al. | |
| 6,309,707 B1 | * | 10/2001 | Mayer et al. | 427/386 |
| 6,525,115 B2 | * | 2/2003 | Wang et al. | 523/466 |

FOREIGN PATENT DOCUMENTS

| | | |
|---|---|---|
| JP | 5-263044 | 10/1993 |
| JP | 7-331165 | 12/1995 |

* cited by examiner

*Primary Examiner*—David W. Wu
*Assistant Examiner*—Satya B Sastri
(74) *Attorney, Agent, or Firm*—Wenderoth, Lind & Ponack, L.L.P.

(57) ABSTRACT

This invention provides a clear paint composition for motorcars which contains 10–80% by weight of polyester resin containing units derived from alicyclic polybasic acid and/or alicyclic polyhydric alcohol, 5–50% by weight of polyisocyanate compound and 0–50% by weight of acrylic resin; and which forms coating having Universal Hardness (HU) of not more than 500 N/mm².

12 Claims, 1 Drawing Sheet

CLEAR PAINT COMPOSITIONS FOR MOTORCARS

This invention relates to clear paint compositions for motorcars, which are capable of forming coatings excelling in resistance to mars caused by car-washing machines and scratch resistance.

Heretofore, means for prevention of mars on motorcar bodies incurred by car-washing machines or of scratches around their keyholes have been in demand. The demand for improvement in that aspect is still intensified recently, from car users who place great importance on appearance. This made it an important task for car makers to develop motorcars with a coating excelling in resistance properties to "mars caused by car-washing machines" and "scratching", to increase market value of their cars.

Whereas, a coating for cars must exhibit, concurrently with resistance properties to mars incurred with car-washing machines and to scratches around keyholes, many coating performances such as impact resistance, weatherability, finished appearance, adherability and the like. A coating satisfying all of those requirements cannot be obtained by simply relying on technologies for softening or hardening the coating film, and makers take great pains in developing well balanced clear paint compositions for motorcars, which will provide coatings satisfying all of the multi-performance requirements.

We have engaged in concentrative studies with the view to develop a well balanced clear paint composition for motorcars, which improves resistance to mars incurred by car-washing machines and resistance to scratches, and concurrently exhibits favorable performances in finished appearance and storage stability as paint, and come to discover that the above object could be accomplished by a clear paint composition for motorcars, which composition comprises polyester resin containing units derived from alicyclic polybasic acid and/or alicyclic polyhydric alcohol, polyisocyanate compound and rheology-controlling agent and forms a coating having Universal Hardness (HU) not higher than 500 N/mm$^2$ and preferably an indentation depth creep (I) at 0.4 mN load as measured by the method specified in the specification of at least 0.5 μm. The present invention is whereupon completed.

Hei 5 (1993)-263044A-JP has disclosed a paint for plastic parts of a motorcar, which paint comprises a polyester resin formed from use of a polybasic acid having an alicyclic structure and/or polyhydric alcohol having an alicyclic structure, and polyisocyanate compound and which is capable of forming a coating of improved soiling resistance without degradation in the coating performance such as impact resistance and bending resistance. This earlier publication, however, nowhere refers to Universal Hardness (HU) of the coating formed.

Thus, the present invention provides a clear paint composition for motorcars, which is characterized by comprising

| | |
|---|---|
| (A) polyester resin containing units derived from alicyclic polybasic acid(s) (a) and/or alicyclic polyhydric alcohol(s)(b) | 10–80% by weight |
| (B) polyisocyanate compound(s) and | 5–50% by weight |
| (C) acrylic resin | 0–50% by weight, | and forming a coating having Universal Hardness (HU) not higher than 500 N/mm$^2$.

Hereinafter the clear paint composition for motorcars of the present invention ("present paint composition") is explained in further details.

Polyester Resin (A)

Figure 1:
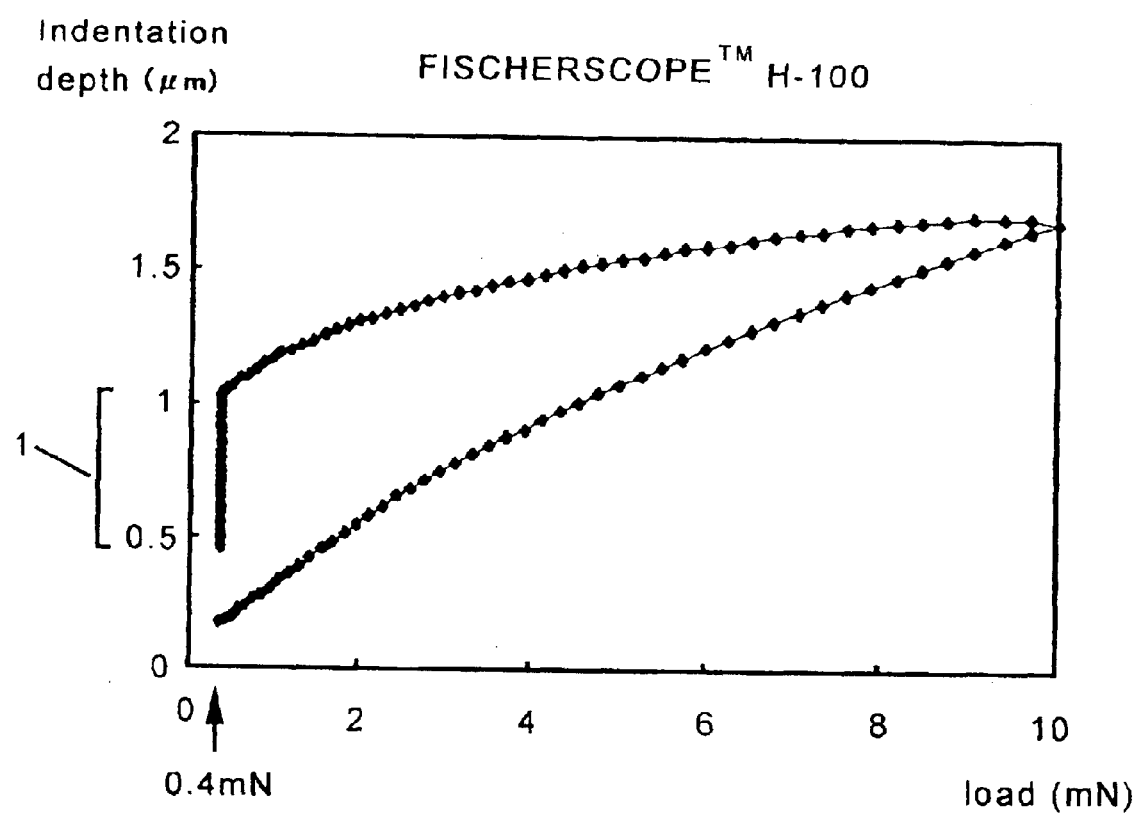
FIG. 1 describes a typical graph in which the relation between the load (horizontal axis) and indentation depth (vertical axis) is plotted.

Polyester resin (A) which is used as the base resin in the present paint composition is prepared by using an alicyclic polybasic acid (a) and/or an alicyclic polyhydric alcohol (b) as the essential monomeric component, if necessary in combination with other polybasic acid (c) and/or other polyhydric alcohol (d). In particular, a hydroxyl-containing polyester resin so formed is preferred.

The alicyclic polybasic acid (a) is a compound containing at least one alicyclic ring, preferably 4-to 6-membered alicyclic ring, and at least 2, preferably 2–3 carboxyl groups, per molecule, specific examples of which include cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, tetrahydrophthalic acid, methyl hexahydrophthalic acid, and anhydrides of those acids.

Other useful polybasic acids (c) include compounds containing at least two carboxyl groups per molecule, which are customarily used as acid component for polyester production. As examples of such acids, phthalic acid, isophthalic acid, terephthalic acid, succinic acid, adipic acid, azelaic acid, sebacic acid, Het acid, maleic acid, fumaric acid, itaconic acid, trimellitic acid, pyromellitic acid and anhydrides of those acids.

Alicyclic polyhydric alcohol (b) is a compound containing at least one alicyclic ring, preferably a 4- to 6-membered alicyclic ring, and at least two, preferably 2–3 hydroxyl groups, per molecule, specific examples including cyclohexane-1,4-dimethylol, hydrogenated bisphenol A, spiroglycol and dihydroxymethyltricyclodecane.

Other useful polyhydric alcohols (d) include those compounds containing at least two hydroxyl groups which are customarily used as alcohol component for polyester production. As examples of such alcohols, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactone diols formed by adding lactones such as ε-caprolactone to these glycols; polyester diols such as bis(hydroxyethyl) terephthalate; and polyhydric alcohols having at least 3 hydroxyl groups per molecule, such as glycerine, trimethylolpropane, trimethylolethane, diglycerine, triglycerine, 1,2,6-hexanetriol, pentaerythritol, dipentaerythritol, tripentaerythritol, sorbitol and mannitol.

The use rate of alicyclic polybasic acid (a) and/or alicyclic polyhydric alcohol (b) [the sum of (a) and (b)] in production of polyester resin (A) is usually 20–70%, preferably 30–60%, inter alia, 35–55%, based on the total amount of the monomers used for production of the polyester resin (A), the percentages being by weight.

Production of polyester resin (A) from above-described alicyclic polybasic acid (a) and/or alicycclic polyhydric alcohol, and optionally other polybasic acid (c) and/or other polyhydric alcohol (d) can be conducted by a method known per se, and resulting polyester resin (A) generally has a weight-average molecular weight within a range of 1,000–1,000,000, preferably 10,000–100,000, inter alia, 30,000–80,000; and a hydroxyl value within a range of generally 50–200 mgKOH/g, preferably 80–150 mgKOH/g.

Polyisocyanate Compound (B)

Polyisocyanate compound (B), which is used as crosslinking agent in the present paint composition, is a compound containing at least two free isocyanate groups per molecule, which includes (unblocked) polyisocyanate compound in which the isocyanate groups are in free form and blocked polyisocyanate compound in which the isocyanate groups are blocked.

As (unblocked) polyisocyanate compound, for example, aliphatic polyisocyanates such as hexamethylene diisocyanate, trimethylhexamethylene diisocyanate, dimeric acid diisocyanate and lysine diisocyanate; alicyclic polyisocyanates such as hydrogenated xylylene diisocyanate, cyclohexylene diisocyanate, methylenebis(cyclohexylisocyanate) and isophorone diisocyanate; aromatic polyisocyanates such as tolylene diisocyanate, phenylene diisocyanate, 4,4'-diphenylmethane diisocyanate, xylylene diisocyanate, tetramethylxylylene diisocyanate and naphthalene diisocyanate; trivalent or higher-valent organic polyisocyanate compounds such as 2-isocyanatoethyl-2,6-diisocyanatocaproate, 3-isocyanatomethyl-1,6-hexamethylene diisocyanate and 4-isocyanatomethyl-1,8-octamethylene diisocyanate (which is often referred to as triamino-nonane triisocyanate); dimers and trimers of these polyisocyanate compounds containing at least two isocyanate groups per molecule; and prepolymers formed through urethanation reaction of these polyisocyanate compounds containing at least two isocyanate groups per molecule with polyhydric alcohol, low-molecular polyester resins or water and the like in excessive presence of isocyanate groups, may be named. Of those, particularly aliphatic polyisocyanates and alicyclic polyisocyanates are preferred.

Blocked polyisocyanate compounds refer to such polyisocyanate compounds as above-named, in which the isocyanate groups are blocked as reacted with a blocking agent. Under heating to a prescribed temperature (usually at least 100° C.), the blocking agent is dissociated and the blocked isocyanate groups in the compounds are freed.

As examples of blocking agents useful for production of such blocked polyisocyanate compounds, phenols, oximes, lactams, alcohols, mercaptanes and active methylene-containing compounds such as diethyl malonate can be named.

Above (unblocked) polyisocyanate compounds and blocked polyisocyanate compounds can be used either singly or in combination.

Acrylic Resin (C)

The present paint compositions can further contain as base resin, in addition to the above-described polyester resin (A), acrylic resin (C) depending on intended use or the like.

As acrylic resin (C), copolymers, which are obtained through a method known per se, for example, radical polymerization by solution polymerization method, of carboxyl-containing unsaturated monomer(s), hydroxyl-containing unsaturated monomer(s) and if necessary other polymerizable unsaturated monomer(s), can be conveniently used.

Said carboxyl-containing unsaturated monomer is a compound containing at least one each of carboxyl group and polymerizable unsaturated bond per molecule, examples of which include (meth)acrylic acid, maleic acid, caprolactone-modified, carboxyl-containing (meth)acrylic monomers (e.g., Placcel™ FM1A, Placcel FM4A, Placcel FM10A; Daicel Chemical Industries, Ltd.) may be named.

Said hydroxyl-containing unsaturated monomer is a compound containing at least one each of hydroxyl group and polymerizable unsaturated bond per molecule, examples of which include hydroxyethyl (meth)acrylate, hydroxypropyl (meth)acrylate, hydroxybutyl (meth)acrylate, (poly)ethylene glycol mono(meth)acrylate, (poly)propylene glycol mono (meth)acrylate, reaction products of those hydroxyl-containing unsaturated monomers with lactone compounds such as β-propiolactone, dimethylpropiolactone, butyrolactone, γ-valerolactone, γ-caprolactone, γ-eaprylolactone, γ-laurylolactone, ε-caprolactone and δ-caprolactone [e.g., Placcel™ FM1, Placcel FM2, Placcel FM3, Placcel FA1, Placcel FA2, Placcel FA3 (Daicel Chemical Industries, Ltd., caprolactone-modified (meth) acrylic acid hydroxyesters)].

Other polymerizable unsaturated monomers are compounds which contain at least one polymerizable unsaturated bond per molecule and which are other than above carboxyl-containing unsaturated monomers and hydroxyl-containing unsaturated monomers, examples of which include $C_1$–$C_{18}$ alkyl or cycloalkyl esters of (meth)acrylic acid such as methyl (meth)acrylate, propyl (meth)acrylate, butyl (meth)acrylate, hexyl (meth)acrylate, octyl (meth)acrylate, lauryl (meth)acrylate and cyclohexyl (meth)acrylate; aromatic polymerizable monomers such as styrene and a-methylstyrene; (meth)acrylamides such as (meth)acrylamide, N-butoxymethyl (meth)acrylamide, N-methylol (meth)acrylamide, and their derivatives; and alkoxysilyl-containing polymerizable monomers such as (meth)acrylonitrile, γ-(meth)acryloxypropyl trimethoxysilane, γ-(meth)acryloxypropylmethyl dimethoxysilane, γ-(meth)acryloxypropyl triethoxysilane and vinyl trimethoxysilane. In particular, use of $C_1$–$C_{18}$ alkyl or cycloalkyl esters of (meth)acrylic acid and aromatic monomers such as styrene is preferred.

It is generally convenient to use those monomeric components within the ranges of based on the total weight of monomers used, carboxyl-containing unsaturated monomer(s), 3–30%, in particular, 4–20%; hydroxyl-containing unsaturated monomer(s), 3–40%, in particular, 5–30%; and other polymerizable unsaturated monomer(s), 37–95%, in particular, 60–91%; the percentages being by weight.

Said acrylic resin (C) which is optionally used in the present paint compositions generally has a weight-average molecular weight within a range of 500–6,000, preferably 500–3,000; and generally has a hydroxyl value within a range of 50–600 mgKOH/g, preferably 60–250 mgKOH/g.

Rheology-Controlling Agent (D)

The present paint compositions can contain a rheology-containign agent (D) in certain cases in addition to above-described three components (A), (B) and (C), with the view to impart thixotropic property to the compositions.

Paint compositions which contain such a rheology-controlling agent (D) can have a sufficiently reduced viscosity in occasions of the composition being subjected to high shear stress, e.g., in occasions of spray-coating, to allow easy spray-coating operation. On the other hand, in such occasions that little shear stress is exerted after it is coated on object surfaces, its apparent viscosity can be increased. In consequence, when the composition is applied onto perpendicular object surfaces or during the subsequent baking following the application, occurrence of coating defects such as dripping, cissing and the like can be prevented and favorable coating finish can be achieved. Furthermore, we found that blending of a rheology-controlling agent (D) with present paint compositions according to the invention is useful also for adjusting Universal Hardness (HU) and the indentation depth creep (I) at 0.4 mN load of coatings formed therefrom, within the respectively intended ranges.

As rheology-controlling agents (D) having such effects, for example, fine particles of crosslinked polymers, polyurea compounds and the like can be named.

As such fine particles of crosslinked polymers, internally crosslinked, fine particulate polymers which are known per se and are obtained by aqueous emulsion or aqueous suspension polymerization method or non-aqueous dispersion polymerization method can be used.

Of those, fine particulate polymers having intramolecularly crosslinked structure which are obtained by aqueous emulsion or aqueous suspension polymerization method can be solidified as separated by such physical or chemical means as evaporation or azeotropic distillation of water, or precipitation or agglomeration of the polymer (particles). It is also possible to directly replace a medium of the intended fine, crosslinked polymer particles from water to other resin, organic solvent and the like, in the occasion of applying such physical or chemical means.

As the fine, crosslinked polymer particles, those obtained by emulsion polymerization of a polymerizable monomer having at least two radical-polymerizable unsaturated groups in its molecule and other radical-polymerizable, unsaturated monomer(s) in the presence of a reactive emulsifying agent containing allyl group(s) in its molecule as disclosed in U.S. Pat. No. 5,348,998, can be conveniently used.

Those fine, crosslinked polymer particles have high crosslinkage density and are substantially non-swelling and non-fusible even in organic solvent of high polymer-dissolving ability such as toluene or ethyl acetate. When added to a present composition which contains an organic solvent, the particles scarcely raise viscosity of the present paint composition and enable to provide a solution (dispersion) of high resin content, i.e., high solid composition.

Generally suitable average particle size of the fine, crosslinked polymer particles is within a range of around 0.01–2 $\mu$m, in particular, 0.05–0.5 $\mu$m. When the particle size falls within the above range, the paint compositions provide coatings excelling in dripping-prevention and finished appearance. As said rheology-controlling agent (D), furthermore, a solid, particulate polyurea compound as disclosed in U.S. Pat. No. 4,677,028, which is formed of a reaction product of isocyanurate trimer obtained from $C_3$–$C_{20}$, preferably $C_5$–$C_{14}$, inter alia, $C_8$–$C_{12}$, diisocyanate compound with an amine compound having at least one primary amino group may also be used.

As the diisocyanate compound, for example, methylene diisocyanate, trimethylene diisocyanate, tetramethylene diisocyanate, hexamethylene diisocyanate, $\omega$, $\omega'$ dipropyl ether diisocyanate, thiodipropyl diisocyanate, cyclohexyl-1,4-diisocyanate, dicyclohexylmethane-4,4'-diisocyanate, 1,5-dimethyl-2,4-bis(isocyanatomethyl)-benzene, 1,5-dimethyl-2,4-bis(o-isocyanatoethyl)-benzene, 1,3,5-trimethyl-2,4-bis(isocyanatomethyl)-benzene, 1,3,5-triethyl-2,4-bis(isocyanatomethyl)-benzene, heterocyclic diisocyanate commercially available under the trademark of Desmodur TT (Bayer AG), dicyclohexyldimethylmethane-4,4'-diisocyanate, 2,4-toluene diisocyanate, 2,6-toluene diisocyanate and diphenylmethane-4,4'-diisocyanate can be conveniently used. In particular, hexamethylen diisocyanate is preferred. These diisocyanate compounds can be used each singly or, two or more of them may be concurrently used to form trimers constituted of different diisocyanate compounds.

On the other hand, amine compounds which are to be reacted with isocyanurate trimers for producing the polyurea compounds can be those containing at least one primary amino group per molecule and not more than 55, preferably 1–24, inter alia, 1–12 carbon atoms. Specific examples include alkylamines such as ethylamine, n-propylamine, sec-propylamine, n-butylamine, sec-butylamine, tert-butylamine, n-pentylamine, $\alpha$-methylbutylamine, $\alpha$-ethylpropylamine, $\beta$-ethylbutylamine, hexylamine, octylamine, decylamine and stearylamine; cycloalkylamines such as cyclohexylamine; aryl amines such as sniline; aralkylamines such as benzylamine and phenethylamine; and alkylenediamines such as hexamethylenediamine.

Also as the amine compounds, those containing at least one primary amino group and at least one ether bond (—O—) and/or hydroxyl group per molecule may be used, examples of which include ethanolamine, 6-aminohexanol, p-methoxybenzylamine, methoxypropylamine, 3,4-dimethoxyphenylethylamine, 2,5-dimethoxyaniline, furfurylamine, tetrahydrofurfurylamine and bis(3-aminopropyl)polytetrahydrofuran (one having a molecular weight of approximately 750).

Above-described amine compounds may be used either singly or in combination of two or more.

In the reaction of an isocyanurate trimer with an amine compound or compounds, either one of them can be used in stoichiometric excess but generally it is convenient to use them at such ratios that the number of primary amino groups of the amine compound(s) be within a range of 0.7–1.5, in particular, 0.9–1.1, per mol of the isocyanurate trimer.

The reaction of an isocyanurate trimer with amine compound(s) can usually be conducted at temperatures ranging from about 10 to about 150° C., preferably from about 20 to about 80° C., in the presence of a suitable solvent. In that occasion, it is convenient to carry out the reaction by adding the amine compound(s) to a solution of the isocyanurate trimer in the solvent. In some instances, the amine compound(s) may be added portionwise at plural stages. As suitable solvent, acetone, methyl isobutyl ketone, 1-methoxy-propanol-2, benzene, toluene, xylene or an aliphatic hydrocarbon such as petroleum ether may be named.

Thus produced solid, particulate polyurea compound preferably has an average particle size generally within a range from about 0.01 to about 50 $\mu$m, in particular, 0.1–20 $\mu$m.

Present Paint Compositions

Clear paint compositions for motorcars, which are provided by the present invention, can contain the above-described polyester resin (A), polyisocyanate compound (B) and acrylic resin (C), at the following ratios, based on the total amount of these three components (A), (B) and (C), the percentages being by weight:

| | |
|---|---|
| Polyester resin (A): | 10–80%, preferably 20–70%, inter alia, 30–60% |
| Polyisocyanate cmpound (B): | 5–50%, preferably 10–50%, inter alia, 20–40% |
| Acrylic resin (C): | 0–50%, preferably 0–40%, inter alia, 5–30% |

When the ratio of polyester resin (A) is less than 10 wt %, generally the coating formed from the paint composition comes to have the indentation depth creep (I) at 0.4 mN load of less than 0.5 $\mu$m, which signifies low resistance of the coating to scratches. Whereas, when the ratio of polyester resin (A) exceeds 80 wt %, generally the Universal Hardness value (HU) of the formed coating exceeds 500 N/mm$^2$, and scratch resistance of the coating is reduced similarly to the case wherein the polyester resin (A) content is less than 10 wt %. On the other hand, when the ratio of polyisocyanate compound (B) is less than 5 wt %, sufficiently hardened coating cannot be obtained. Again, when it exceeds 50 wt %, stability of the paint composition is liable to be lowered. Furthermore, when the ratio of acrylic resin (C) exceeds 50 wt %, the coating formed from the paint composition may have Universal Hardness (HU) more than 500 N/mm$^2$ or the indentation depth creep (I) at 0.4 mN load, less than 0.5 μm, signifying insufficient scratch resistance of the coating.

In cases of using above-described rheology-controlling agent (D), it is generally preferred to use it within a range of 1–30 wt %, in particular, 1–20 wt %, inter alia, 3–15 wt %, based on the total weight (as solid) of the polyester resin (A), polyisocyanate compound (B) and acrylic resin (C), from the viewpoints of prevention of the coating from dripping and stability of the paint composition.

Those clear paint compositions for motorcars according to the present invention may further contain, in addition to the polyester resin (A) component, polyisocyanate compound (B), acrylic resin (C) and rheology-controlling agent (D), ultraviolet absorber, photostabilizer, surface regulating agent and other additives to paint, organic solvent, etc. The compositions can be used as clear paint compositions for motorcars, which are substantially free of pigment.

The present paint compositions can be prepared, for example, by homogeneously mixing the above-described components in organic solvent. As useful organic solvent, for example, hydrocarbon solvents such as toluene, xylene and high-temperature boiling petroleum hydrocarbons; ketone solvents such as methyl ethyl ketone, cyclohexanone and isophorone; ester solvents such as ethyl acetate, butyl acetate, ethylene glycol monoethyl ether acetate and diethylene glycol monoethyl ether acetate; alcoholic solvents such as methanol, ethanol and butanol; and ether solvents such as ethylene glycol monoethyl ether, ethylene glycol monobutyl ether and diethylene glycol monobutyl ether may be named. These can be used either singly or as mixtures of at least two of them.

Furthermore, with the view to promote crosslinking reaction in the coating films formed of present paint compositions, curing catalyst may be added to present paint compositions. Examples of useful curing catalyst include organometal compounds such as tin caprylate, dibutyltin di(2-ethylhexanoate), dioctyltin di(2-ethylhexanoate), dioctyltin diacetate, dibutyltin dilaurate, dibutyltin oxide, monobutyltin trioctate, lead 2-ethylhexanoate and zinc caprylate. The use rate of such curing catalyst is not subject to particular limitation, but generally suitable use rate ranges 0.005–5 wt %, in particular, 0.01–3 wt %, based on the total amount of the polyester resin (A), polyisocyanate compound (B), acrylic resin (C) and rheology-controlling agent (D) (as solid).

The present paint compositions can be applied onto substrate surfaces by application methods known per se, such as airless spraying, air spraying, rotary atomizing, electrostatic impressing and the like. Convenient thickness of applied films in that occasion is usually within a range of 10–70 μm, in particular, 20–60 μm, in terms of cured film thickness. When an unblocked polyisocyanate compound is used as the polyisocyanate compound (B), the coating formed from the resulting paint compositions may in some instances be cured at ambient temperatures. Usually it is preferred, however, to cure the coatings under heating at temperatures of from about 60 to about 160° C., in particular, from about 80 to about 140° C., for about 10–90 minutes, in particular, about 20–60 minutes.

By suitably adjusting the blend ratios of said polyester resin (A), polyisocyanate compound (B), acrylic resin (C) and rheology-controlling agent (D) within the above-specified ranges for the present paint compositions, the coatings formed therefrom can come to exhibit Universal Hardness (HU) not higher than 500 N/mm$^2$, preferably in the range of 50–150 N/mm$^2$, inter alia, 80–140 N/mm$^2$; and further desirably have the indentation depth creep (I) at 0.4 mN load of at least 0.5 μm, preferably in the range of 0.5–1.0 μm, inter alia, 0.5–0.7 μm.

Coatings formed from the present paint compositions having Universal Hardness (HU) and also preferably the indentation depth creep (I) at 0.4 mN load, within the above-specified ranges concurrently possess suitable hardness and elasticity in good balance. When such a coating is scratched, the scars are apt to recover and return to the original state and exhibit excellent resistance properties to scratches and mars incurred by car-washing machines.

Universal Hardness (HU) and indentation depth creep (I) at 0.4 mN load of a coating formed from a present paint composition are the property values measured with a micro-hardness testing system, "Fischerscope™ H-100" of Helmut Fischer GmbH & Co. Universal Hardness (HU) is measured by applying a prescribed load on Vickers Indenter [a diamond pyramid with a square base area and with an angle of α=136°] placed on the coating to be tested, measuring the indentation (penetration) depth (h) of the indenter into the coating, and calculating the Hardness from the load exerted and the indented surface area determined from said indentation depth (h). Specifically, it is a value obtained by substituting the values of the tested load and indentation depth into the following equation:

$$HU=F/(26.43 \times h^2)$$

F=tested load (mN)
h=indentation depth (μm)

In measuring hardness of a coating with "Fischerscope™ H-100", a typical graph in which the relation between the load (horizontal axis) and indentation depth (vertical axis) is plotted is shown as FIG. 1.

"Indentation depth creep (I) at 0.4 mN load" as referred to in the present invention is measured as follows. Continuously increasing load from 0.4 mN to 10 mN is exerted on a coating to be tested, and then the load is gradually reduced back to 0.4 mN, at which the load is removed. The reduction in indentation depth in the tested coating in 100 seconds after removal of the load is the numerically expressed value of indentation depth creep (I) at 0.4 mN load, which is observed as "1" in FIG. 1. Coatings exhibiting large (I) values have elasticity and favorable scratch resistance.

As above-described, use of present paint compositions enables formation of clear coatings excelling in resistance to mars incurred by car-washing machines and scratch resistance.

Accordingly, present paint compositions can be advantageously used for forming top layer clear coating in multi-layered coating film composed of at least one layer of coloring base coating and at least one layer of clear coating.

Hereinafter processes for forming such multi-layered coating are described in further details.

Formation of Multi-Layered Coating

Formation of multi-layered coating using a present paint composition can be performed by, for example, the following methods (a)–(c).

Method (a):

This method can be practiced in 2-coat-1-bake (2C1B) system or 2-coat-2bake (2C2B) system, which comprise:

applying ordinary coloring base paint for motorcars onto metallic or plastic substrate for motorcar bodies, either directly or after applying a primer such as a cationic electropaint and if necessary a surfacer and curing them, by such means as airless spraying, air spraying or rotary atomizing application (which may be electrostatically impressed), to a cured coating film thickness of about 10–about 50 μm; heating the formed coloring base coating at about 100°–about 180° C., preferably at about 120°–about 160° C., for about 10–about 40 minutes to cure the coating, or allowing it to stand at room temperature or preheating it for several minutes without effecting the curing; thereafter applying a clear paint composition for motorcars of the present invention by a similar coating method to a cured coating film thickness of about 10–about 70 μm; and heating the coating at about 60°–about 160° C., preferably about 80°–about 140° C., for about 10–about 90 minutes to bring about crosslinkage and curing.

Method (b):

This method can be practiced by 3-coat-1-bake (3C1B), 3-coat-2-bake (3C2B) or 3-coat-3-bake (3C3B) systems, which comprise procedures similar to those of the above method (a), i.e., applying ordinary coloring base paint and curing, or leaving it at room temperature or preheating it for several minutes without curing; applying a first clear paint composition for motorcars onto the coloring base coating by similar application means to a cured coating film thickness of from about 10 to about 50 μm; heating and curing the same at about 60°–about 160° C., preferably about 80°–about 140° C., for about 10–about 90 minutes, or leaving the coating at room temperature or preheating it for several minutes without curing; then applying a second clear paint composition for motorcars of the present invention by similar application means to a cured coating film thickness of from about 10 to about 70 μm; and heating and curing the coating at about 60°–about 180° C., preferably at about 80°–about 140° C., for about 10–about 90 minutes.

As the first clear paint composition for motorcars here, a top coating paint capable of forming a clear coating which is conventionally used for motorcar coating, or a clear paint composition of the present invention can be used.

Method (c):

This method can be practiced by 3-coat-1-bake (3C1B), 3-coat-2-bake (3C2B) or 3-coat-3-bake (3C3B) systems, which comprise procedures similar to those of the above method (a), i.e., applying a first coloring base paint and curing, or leaving it at room temperature or preheating it for several minutes without curing, to form the first coloring base coating; applying a second coloring base paint onto the first coloring base coating to a cured coating film thickness of from about 10 to about 50 μm; heating and curing the same at about 100°–about 180° C., preferably about 120°–about 160° C., for about 10–about 40 minutes, or leaving the coating at room temperature or preheating it for several minutes without curing; then applying a clear paint composition of the present invention by similar application means to a cured coating film thickness of from about 10 to about 70 μm; and heating and curing the same coating at about 60–about 160° C., preferably at about 80–about 140° C., for about 10–about 90 minutes.

As the first coloring base paint, any conventional coloring base paint for motorcars can be used. As the second coloring base paint, coloring transparent paint having a minor hiding power of the extent allowing perception of color tone of the first coloring base paint (solid color, metallic color or iridescent color) underneath, through the second coloring base coating is used. Accordingly, hiding power of the second coloring base coating is generally less than that of the first coloring base coating.

Thus, by any of above-described methods, a multi-layered coating excelling in resistance to mars incurred by car-washing machines and scratch resistance, which comprises at least one layer of coloring base coating and at least one layer of clear coating is provided, the top layer clear coating being formed of a paint composition according to the present invention.

Hereinafter the present invention is more specifically explained, referring to working examples. The scope of the present invention, however, is not limited by these examples. Parts and percentages appearing in the examples signify parts by weight and percent by weight.

Production Example of Polyester Resin No. 1

A four-necked flask equipped with a heating device, stirrer, thermometer and a reflux condenser was charged with the following monomers:

| | |
|---|---|
| 1,4-cyclohexanedimethanol | 74 parts |
| trimethylolpropane | 65 parts |
| 1,4-cyclohexanecarboxylic acid | 66 parts |
| adipic acid | 74 parts |
| dibutyltin dilaurate | 0.5 part | and the content was heated.

After the temperature of the content was raised from 160° C. to 230° C. over 3 hours, it was maintained at 230° C. for an hour, and the formed condensation water was distilled off through a rectification column. Then 5 parts of xylene was added to the content, the xylene and condensation water were refluxed, and the water was removed with a water separator. Two hours after addition of the xylene, acid value measurement was started and at the time when the acid value reached 2 mgKOH/g, the content was cooled to 140° C. Thereafter phthalic anhydride was added and an addition reaction was conducted by maintaining the temperature at 140° C. for 2 hours. The reaction was terminated by cooling the system then, and further mixed solvent A (note 1) was added to provide polyester resin No. 1 having a solid content of 70%.

(note 1) mixed solvent A:

xylene/Swasal™ 1,000 (Cosmo Oil Co., Ltd. a high-boiling petroleum solvent)=50/50 (weight ratio).

Production Examples of Polyester Resin Nos. 2 and 3

Procedures of above production example of polyester resin No.1 were repeated except that the monomeric composition was changed to those as shown in Table 1, to provide polyester resin No.2 and polyester resin No.3. Table 1 concurrently shows the monomeric composition used for polyester resin No. 1.

TABLE 1

| Polyester Resin | No. 1 | No. 2 | No. 3 |
|---|---|---|---|
| 1,4-cyclohexanedimethanol | 74 | 74 | |
| trimethylolpropane | 65 | 65 | 65 |
| neopentyl glycol | | | 53 |
| 1,4-cyclohexanedicarboxylic acid | 66 | 153 | |

TABLE 1-continued

| Polyester Resin | No. 1 | No. 2 | No. 3 |
|---|---|---|---|
| phthalic anhydride | | | 56 |
| adipic acid | 74 | | 74 |
| dibutyltin dilaurate | 0.5 | 0.5 | 0.5 |
| | | | (by parts) |

Production Example of Acrylic Resin No. 1

A reactor equipped with a stirrer, cooler, temperature controller, nitrogen inlet pipe and a dropping funnel was charged with 80 parts of mixed solvent A (note 1) and 20 parts of n-butyl alcohol and the atmosphere inside the reactor was replaced with nitrogen, followed by heating under stirring. After the inside temperature reached 120° C., a monomeric mixture of following composition was dropped into the reactor over 3 hours:

| | |
|---|---|
| styrene | 20 parts |
| butyl methacrylate | 38.6 parts |
| 2-ethylhexyl methacrylate | 15 parts |
| hydroxyethyl methacrylate | 12 parts |
| hydroxyethyl acrylate | 10.7 parts |
| methacrylic acid | 3.7 parts |
| azobisisobutyronitrile | 1 part. |

After the dropping was completed, the system was aged for 30 minutes at 120° C., to provide acrylic resin No. 1 having a hydroxyl value of 100 mgKOH/g, weight-average molecular weight of 3,500 and a solid content of 70%.

Production Example of Acrylic Resin No. 2

A reactor equipped with a stirrer, cooler, temperature controller, nitrogen inlet pipe and a dropping funnel was charged with 80 parts of Swasol™ 1500 (Cosmo Oil Co., Ltd., a high-boiling petroleum solvent) and 20 parts of n-butyl alcohol and the atmosphere inside the reactor was replaced with nitrogen, followed by heating under stirring. After the inside temperature reached 120° C., a monomeric mixture of following composition was dropped into the reactor over 3 hours:

| | |
|---|---|
| isobutyl methacrylate | 52.5 parts |
| hydroxyethyl methacrylate | 46.5 parts |
| acrylic acid | 1 part |
| azobisisobutyronitrile | 1 part. |

After the dropping was completed, the system was aged at 110° C. for 30 minutes and cooled. The product's solid content was adjusted by addition of Swasol™ 1500 to provide acrylic resin No.2 having a hydroxyl value of 90 mgKOH/g, weight-average molecular weight of 3600 and a solid content of 70%.

Production Example of Rheology-Controlling Agent

To terminal carboxyl group of a self-condensed polyester resin having a resin acid value of 30 and a number-average molecular weight of about 1800, which was prepared by dehydrative condensation of 12-hydroxystearic acid under toluene refluxing using methanesulfonic acid as the catalyst, glycidyl methacrylate was added under catalytic action of dimethylaminoethanol, to introduce polymerizable double bonds into the resultant macromonomer (1). Said macromonomer (1) had a solid content of 70% and about one polymerizable double bond per molecule, based on the number-average molecular weight.

Separately, 174 parts of butyl acetate was put in a flask and heated under refluxing, and into which a mixture of 297 parts of 70% macromonomer (1) solution, 195.9 parts of methyl methacrylate, 18.5 parts of glycidyl methacrylate, 163.0 parts of xylene and 9.6 parts of 2,2'-azobisisobutyronitrile was dropped at a uniform rate over 3 hours, followed by further 2 hours' aging. Then a mixture composed of 0.05 part of p-t-butylcatechol, 3.8 parts of methacrylic acid and 0.5 part of dimethylaminoethanol was added into the flask. The reaction was carried out at 140° C. for about 5 hours until the resin acid value reached 0.5, to provide macromonomer (2) having a solid content of 50%.

Thus obtained macromonomer (2) was a graft polymer having the first segments attributable to poly-12-hydroxystearic acid and the second segments of a copolymer of methyl methacrylate and glycidyl methacrylate, which had on average 4 polymerizable unsaturated double bonds per molecule.

Separately, 153 parts of xylene was placed in a flask and heated to 125° C., into which then a mixture of 50 parts of 2-ethylhexyl acrylate, 23 parts of n-butyl acrylate, 25 parts of 2-hydroxyethyl acrylate, 2 parts of acrylic acid and 4.5 parts of t-butyl peroctoate was dropped over 4 hours, followed by 2 hours' aging.

Thus obtained acrylic resin varnish had a solid content of 65% and a number-average molecular weight of 7000. To 100 parts of this acrylic resin varnish, 2 parts of glycidyl methacrylate, 0.01 part of 4-t-butylpyrocatechol and 0.15 part of tetrabutylammonium bromide were added, followed by 7 hours' stirring at 115° C. Whereby polymerizable double bonds were introduced into the molecules to provide macromonomer (3). The number of so introduced double bonds into said macromonomer (3) was about 1.0 per molecule, based on the number-average molecular weight. The macromonomer (3) had an SP value of 8.70 and a hydroxyl value of 121 mgKOH/g.

A flask was charged with 190 parts of heptane, 20 parts of 50% macromonomer (2) solution and 23 parts of 65% macromonomer (3) solution, into which then a mixture composed of 50 parts of methyl methacrylate, 50 parts of methyl methacrylate, 50 parts of 2-hydroxyethyl acrylate, 1.5 parts of glycidyl methacrylate, 0.8 part of methacrylic acid and 2 parts of 2,2'-azobisisobutyronitrile was dropped over 5 hours at refluxing temperature, followed by 2 hours' aging. Then 0.1 part of dimethylaminoethanol was added, followed by further 4 hours' aging to provide a rheology-controlling agent which was a non-aqueous dispersion of fine polymer particles.

Thus obtained dispersion was white in color and had a solid content of 40%. The particles had a size of about 160 nm (peak particle diameter) which was measured with Coulter N4 model Sub-micron Particle Analyzer of Beckman Coulter, Inc.

EXAMPLES AND COMPARATIVE EXAMPLES

A clear coat No. 1 having a solid content of 40% of Example 1 was obtained by blending 85.7 parts of polyester resin No. 1 (solid content: 60 parts), 40 parts of Desmodur™ N3300 (note 2) (solid content: 40 parts) as the polyisocyanate compound, 0.1 part of SCAT™ 24 (note 3) (solid content: 0.1 part) as the catalyst, and 2 parts of DISPAR- LON™ LC-951 (note 4) (solid content: 0.2 part), and diluting the blend with mixed solvent A (note 1).

Examples 2–4 and Comparative Examples 1–4

Clear coat No.2–8 of Examples 2–4 and Comparative Examples 1–4 were obtained by treating blends of the compositions as shown in Table 2 in the similar manner to Example 1.

TABLE 2

Paint Composition

|  | Example 1 | Example 2 | Example 3 | Example 4 |
|---|---|---|---|---|
| Clear paint composition | No. 1 | No. 2 | No. 3 | No. 4 |
| Polyester resin No. 1 (solid content) | 85.7 (60) | 57.1 (40) |  |  |
| Polyester resin No. 2 (solid content) |  |  | 85.7 (60) | 85.7 (60) |
| Polyester resin No. 3 (solid content) |  |  |  |  |
| Desmodur N3300 (note 2) (solid content) | 40 (40) | 30 (30) | 40 (40) | 40 (40) |
| Acrylic resin No. 1 (solid content) |  | 42.8 (30) |  |  |
| Acrylic resin No. 2 (solid content) |  |  |  |  |
| Rheology-controlling agent |  |  |  | 12.5 (5) |
| SCAT24 (note 3) | 0.1 (0.1) | 0.1 (0.1) | 0.1 (0.1) | 0.1 (0.1) |
| DISPARLON LC-951 (note 4) | 2 (0.2) | 2 (0.2) | 2 (0.2) | 2 (0.2) |
| Organic solvent (note 5) | 135.4 | 131.3 | 135.4 | 123 |
| Paint composition (solid content) | 263.25 (105.3) | 263.25 (105.3) | 263.25 (105.3) | 263.25 (105.3) |

|  | Comparative Example 1 | Comparative Example 2 | Comparative Example 3 | Comparative Example 4 |
|---|---|---|---|---|
| Clear paint composition | No. 5 | No. 6 | No. 7 | No. 8 |
| Polyester resin No. 1 (solid content) |  |  | 7.1 (5) | 7.1 (5) |
| Polyester resin No. 2 (solid content) |  | 57.1 (40) |  |  |
| Polyester resin No. 3 (solid content) | 85.7 (60) |  |  |  |
| Desmodur N3300 (note 2) (solid content) | 40 (40) | 30 (30) | 30 (30) | 30 (30) |
| Acrylic resin No. 1 (solid content) |  |  | 92.8 (65) | 92.8 (65) |
| Acrylic resin No. 2 (solid content) |  | 42.8 (30) |  |  |
| Rheology-controlling agent |  |  |  | 12.5 (5) |
| SCAT24 (note 3) | 0.1 (0.1) | 0.1 (0.1) | 0.1 (0.1) | 0.1 (0.1) |
| DISPARLON LC-951 (note 4) | 2 (0.2) | 2 (0.2) | 2 (0.2) | 2 (0.2) |
| Organic solvent (note 5) | 135.5 | 131.25 | 131.25 | 118.8 |
| Paint composition (solid content) | 263.25 (105.3) | 263.25 (105.3) | 263.25 (105.3) | 263.25 (105.3) |

(note 2) Desmodur ™ N3300: SUMIKA Bayer Urethane Co., Ltd. hexamethylenediisocyanurate
(note 3) SCAT ™ 24: Sankyo Organic Chemicals Co., Ltd. a tin catalyst
(note 4) DISPARLON ™ LC-951: Kusumoto Chemicals, Ltd. a leveling agent
(note 5) Organic solvent: butyl acetate/methyl isobutyl ketone = 50/50

Preparation of Test Panels (for Coating Performance Tests)

Each of cold-drawn steel sheet treated with Palbond™ #3020 (Nippon Parkerizing Co., Ltd., a zinc phosphate treating agent) was electropainted with ELECRONTM™ GT-10 (Kansai Paint Co., a cationic electrodeposition paint) to form an electrodeposited coating of 20 μm in dry film thickness. On said coating TP™-65 (Kansai Paint Co., Ltd., an intermediate paint) was applied as an intermediate coating to a thickness (as cured film thickness) of 35 μm, and baked at 140° C. for 20 minutes. Then MAGICRON™ 515 (Kansai Paint Co., a top coating base paint) was applied to a thickness of 15 μm (as cured film thickness), followed by 7 minutes' setting to volatilize the solvent. Those clear paint composition Nos. 1–8 for motorcars which were prepared in above Examples and Comparative Examples were spray-coated on the above panels to a thickness of 20 μm (as cured film thickness) and baked concurrently with said top coating base paint at 140° C. for 20 minutes to provide the test panels.

Test Result

Results of the tests using above test panels were as shown in Table 3. As understood from the test results, Tu-kon hardness conventionally used for measuring coating hardness did not show correlation with scratch resistance, while Universal Hardness (HU) and indentation depth creep (I) at 0.4 mN load showed good correlation with scratch resistance.

TABLE 3

|  |  | Example 1 | Example 2 | Example 3 | Example 4 |
|---|---|---|---|---|---|
| Coating appearance (note 7) |  | ○ | ○ | ○ | ○ |
| Tu-kon hardness (note 8) |  | 4 | 4 | 4 | 4.5 |
| Coating hardness (note 9) | Universal Hardness (N/mm$^2$) | 125 | 139 | 145 | 150 |
|  | Indentation depth creep at 0.4 mN load (μm) | 0.6 | 0.6 | 0.6 | 0.7 |
| Scratch resistance (note 10) |  | ○ | ○ | ○ | ○ |

|  |  | Comparative Example 1 | Comparative Example 2 | Comparative Example 3 | Comparative Example 4 |
|---|---|---|---|---|---|
| Coating appearance (note 7) |  | ○ | ○ | ○ | ○ |
| Tu-kon hardness (note 8) |  | 4 | 5 | 4 | 4.5 |
| Coating hardness (note 9) | Universal Hardness (N/mm$^2$) | 172 | 526 | 231 | 239 |
|  | Indentation depth creep at 0.4 mN load (μm) | 0.2 | 0.2 | 0.2 | 0.3 |
| Scratch resistance (note 10) |  | X | Δ | X | X |

(note 7) Coating appearance: appearance of the test panels was visually evaluated according to the following rating standard: ○: leveling property, gloss and distinctness-of-image-gloss were good Δ: one or more of leveling property, gloss and distinctness-of-image gloss was inferior X: one or more of leveling property, gloss and distinctness-of image-gloss was markedly inferior.
(note 8) Tu-kon hardness: the test panels were left to stand in a constant-temperature room at 20° C. for 4 hours, and hardness of the coatings was measured with TUKON microhardness tester manufactured by American Chain & Cable Company.

TABLE 3-continued (note 9) Coating hardness: using FISCHERSCOPE ™ H-100 (Helmut Fischer GmbH & Co., a microhardness testing system), continuously varied load from 0.4 mN to 10 mN was applied onto a coating to be tested with Vickers Indenter [a diamond pyramid with a square base area and with an angle of $\alpha = 136°$] and Universal Hardness (HU) and indentation depth creep at 0.4 mN load ($\mu$m) were measured. Said indentation depth creep (I) at 0.4 mN load was determined by gradually reducing the load from 10 mN to 0.4 mN, at which the load is removed and measuring the reduction in indentation depth in the tested coating in 100 seconds after removal of the load.
(note 10) Scratche resistance: On each test panel, polishing powder (DARUMA ™ Cleanser) as kneaded with water into a thick paste was placed, on which a tester terminal was applied under a load of 0.5 kg and moved to make a reciprocating motion 25 times. The surface condition of the coating thereafter was visually evaluated: ○: no change was perceived in coated surface gloss Δ: slight gloss deterioration was perceived X: notable gloss deterioration was perceived.

What is claimed is:

1. A clear paint composition for motorcars which comprises:

10–80% by weight of polyester resin (A) containing units derived from (a) cyclohexane-1,4-dicarboxylic acid and (b) cyclohexane-1,4-dimethylol, 5–50% by weight of polyisocyanate compound (B), and 0–50% by weight of acrylic resin (C), the weight percentages being based on the total amount of (A), (B) and (C), and further comprises 1–30% by weight, based on the total amount of (A), (B) and (C), of rheology-controlling agent (D) selected from the group consisting of fine particles of crosslinked polymer and polyurea compound, and wherein the clear paint composition is capable of forming a coating having Universal Hardness (HU) not higher than 500 N/mm².

2. A clear paint composition for motorcars according to claim 1, which is capable of forming a coating showing an indentation depth creep (I) at 0.4 mN load of at least 0.5 $\mu$m.

3. A clear paint composition for motorcars according to claim 1, in which said polyester resin (A) contains the sum of (a) cyclohexane-1,4-dicarboxylic acid and (b) cyclohexane-1,4-dimethylol within a range of 20–70% by weight, based on the total amount of the monomers used for producing the polyester resin (A).

4. A clear paint composition for motorcars according to claim 1, in which the polyester resin (A) has a weight-average molecular weight within a range of 10,000–100,000.

5. A clear paint composition for motorcars according to claim 1, in which said polyester resin (A) is a hydroxyl-containing polyester resin having a hydroxyl value within a range of 50–200 mgKOH/g.

6. A clear paint composition for motorcars according to claim 1, in which said polyisocyanate compound (B) is selected from the group consisting of aliphatic polyisocyanates and alicyclic polyisocyanates.

7. A clear paint composition for motorcars according to claim 1, in which said acrylic resin (C) is obtained through radical copolymerizaion of 3–30% by weight of carboxyl-containing unsaturated monomer(s), 3–40% by weight of hydroxyl-containing unsaturated monomer(s) and 37–95% by weight of other polymerizable unsaturated monomer(s), based on the total amount of all the monomers.

8. A clear paint composition for motorcars according to claim 1, in which the acrylic resin (C) has a weight-average molecular weight within a range of 500–6,000 and a hydroxyl value within a range of 50–600 mgKOH/g.

9. A clear paint composition for motorcars according to claim 1, which contains

| | |
|---|---|
| polyester resin (A) | 20–70% by weight |
| polyisocyanate compound (B) and | 10–50% by weight |
| acrylic resin (C) | 0–40% by weight. |

10. A clear paint composition for motorcars according to claim 1, which is capable of forming a coating having Universal Hardness (HU) within a range of 50–150 N/mm².

11. A clear paint composition for motorcars according to claim 1, which is capable of forming a coating having an indentation depth creep (I) at 0.4 mN load within a range of 0.5–1.0 $\mu$m.

12. A multi-layered coating comprising at least one layer of coloring base coating and at least one layer of clear coating, in which the clear coating as the top layer is formed of a clear paint composition for motorcars as described in claim 1.

* * * * *